(12) United States Patent
Dong et al.

(10) Patent No.: US 8,688,692 B2
(45) Date of Patent: Apr. 1, 2014

(54) HIGH QUANTITATIVE PATTERN SEARCHING USING SPATIAL INDEXING

(75) Inventors: Jin Dong, Beijing (CN); Ta-Hsin Li, Danbury, CT (US); Hua Liang, Beijing (CN); Ming Xie, Beijing (CN); Wen Jun Yin, Beijing (CN); Bin Z. Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 12/891,353

(22) Filed: Sep. 27, 2010

(65) Prior Publication Data

US 2012/0078943 A1  Mar. 29, 2012

(51) Int. Cl.
*G06F 17/30* (2006.01)

(52) U.S. Cl.
USPC ............................. 707/724; 707/776; 707/797

(58) Field of Classification Search
USPC .......... 707/722, 724, 776, 778, 797, E17.012, 707/E17.018, E17.05, E17.087, 918, 919, 707/921; 382/181, 190, 191, 192, 193, 194, 382/199, 201, 203, 204, 205, 206
See application file for complete search history.

(56) References Cited

U.S. PATENT DOCUMENTS 7,080,065 B1 *  7/2006  Kothuri et al. ........................ 1/1
7,185,012 B1 *  2/2007  Koudas et al. ........................ 1/1
8,041,694 B1 * 10/2011  Bayardo et al. ............... 707/705
2003/0097356 A1 *  5/2003  Lee et al. ........................... 707/3
2006/0155679 A1 *  7/2006  Kothuri et al. ................... 707/3
2012/0054195 A1 *  3/2012  Hu et al. ........................ 707/743

OTHER PUBLICATIONS

"The Importance of Retail Site Selection in Marketing Management and Hypothetical Approaches Used in Site Selection" to Karadeniz, Journal of Naval Science and Engineering 2009, vol. 5, pp. 79-90.*
Han et al., Frequent pattern mining: current status and future direction, Jun. 22, 2006, Data Min Knowl Disc (2007), pp. 55-78.*
Li et al. "A new K-NN Query algorithm based on the Clustering and sorting of Minimum Bounding Rectangle", 2010 Second International Conference on Intelligent Human-Machine Systems and Cybernetics, pp. 196-199.*
Han, J. et al., "Mining Frequent Patterns without Candidate Generation: A Frequent-Pattern Tree Approach", Data Mining and Knowledge Discovery, 2004, 8, 53-87,Kluwer Academic Publishers. Manufactured in The Netherlands.
Wikipedia, "Boolean Analysis" last modified Feb. 16, 2010.
Wikipedia, "Critical Mass" last modified Nov. 18, 2009.
Wikipedia, "Data Mining" last modified Apr. 28, 2010.
Wikipedia, "R-Tree" last modified May 4, 2010.

* cited by examiner

*Primary Examiner* — Ajay Bhatia
*Assistant Examiner* — Randall Burns
(74) *Attorney, Agent, or Firm* — Scully, Scott, Murphy & Presser, P.C.; Daniel P. Morris, Esq.

(57) ABSTRACT

A computer searching technique identifies high quantitative patterns in data. A spatial indexing technique, such as an R-tree is used to represent the data. Then a pattern searching algorithm is used to identify anchor points that define the componentwise minimum patterns. High quantitative patterns are found responsive to the componentwise minimum patterns. The search strategy is demonstrated relevant to the problem of finding suitable locations for a retail business with reference to environments of prior successful retail businesses.

17 Claims, 7 Drawing Sheets

OUTPUT OF THE SYSTEM FOR A REAL APPLICATION

| REGION ID | COMPANY | STORE | RESTAURANT | BANK BRANCH | ResidentialArea_high | ResidentialArea_low | DOMINANCE NUMBER |
|---|---|---|---|---|---|---|---|
| 53 | 0 | 0 | 0 | 1 | 0 | 0 | 420 |
| 101 | 4 | 1 | 0 | 1 | 0 | 0 | 403 |
| 100 | 0 | 2 | 0 | 2 | 0 | 0 | 388 |
| 244 | 0 | 2 | 0 | 2 | 0 | 0 | 388 |
| 193 | 6 | 1 | 0 | 1 | 0 | 0 | 375 |
| 337 | 24 | 0 | 1 | 1 | 0 | 0 | 371 |
| 88 | 0 | 2 | 0 | 4 | 0 | 0 | 367 |
| 379 | 22 | 1 | 0 | 3 | 0 | 0 | 366 |
| 144 | 27 | 1 | 0 | 1 | 0 | 0 | 360 |
| 323 | 24 | 1 | 0 | 1 | 1 | 1 | 352 |

TOP 10 FREQUENT PATTERNS

| REGION ID | COMPANY | STORE | RESTAURANT | BANK BRANCH | ResidentialArea_high | ResidentialArea_low | DOMINANCE NUMBER |
|---|---|---|---|---|---|---|---|
| 117 | 30 | 0 | 0 | 1 | 0 | 0 | 351 |
| 220 | 3 | 5 | 0 | 4 | 1 | 0 | 345 |
| 26 | 4 | 5 | 0 | 5 | 1 | 0 | 331 |
| 89 | 4 | 5 | 1 | 5 | 1 | 0 | 331 |
| 145 | 4 | 5 | 0 | 3 | 2 | 0 | 328 |
| 191 | 14 | 0 | 0 | 3 | 2 | 0 | 322 |
| 418 | 14 | 0 | 0 | 3 | 0 | 6 | 322 |
| 71 | 37 | 1 | 0 | 5 | 1 | 6 | 307 |
| 131 | 40 | 1 | 0 | 5 | 1 | 6 | 296 |
| 127 | 24 | 5 | 0 | 2 | 3 | 5 | 276 |

TOP 10 - 20 FREQUENT PATTERNS

| REGION ID | COMPANY | STORE | RESTAURANT | BANK BRANCH | ResidentialArea_high | ResidentialArea_low | DOMINANCE NUMBER |
|---|---|---|---|---|---|---|---|
| 51 | 53 | 2 | 4 | 2 | 0 | 0 | 268 |
| 128 | 39 | 7 | 1 | 4 | 3 | 6 | 226 |
| 129 | 39 | 7 | 1 | 4 | 3 | 6 | 226 |
| 62 | 50 | 6 | 3 | 4 | 4 | 10 | 207 |
| 199 | 52 | 6 | 2 | 4 | 3 | 9 | 197 |
| 83 | 56 | 4 | 3 | 9 | 1 | 5 | 197 |
| 316 | 32 | 2 | 5 | 9 | 1 | 9 | 193 |
| 270 | 53 | 4 | 4 | 8 | 2 | 7 | 186 |
| 66 | 33 | 7 | 5 | 7 | 0 | 10 | 184 |
| 348 | 62 | 2 | 1 | 5 | 0 | 6 | 182 |

TOP 10 - 30 FREQUENT PATTERNS

FIG. 10

HIGH QUANTITATIVE PATTERN SEARCHING USING SPATIAL INDEXING

BACKGROUND

The present invention relates to the field of computerized data mining and particularly to searching for critical mass solutions in data.

An example of a data mining problem might be selecting a location for a branch of an existing business, or a location for a new business, based upon the past failures and successes of similar businesses in similar locations. For example, in the retail industry, it is helpful to construct a set of rules that determine where a new retail store should be placed. Mining data for the most frequent patterns associated with a set of successful retail stores (common features with high likelihood) is a useful method of discovering such rules from historical data.

One form of data mining ignores quantitative information, and converts the data into Boolean patterns, see e.g. Jiawei Han, Jian Pei, Yiwen Yin and Runying Mao, "Mining Frequent Patterns without Candidate Generation: A Frequent-Pattern Tree Approach", Data Mining and Knowledge Discovery, Volume 8, pp. 53-87, 2004. In a Boolean pattern, either a feature is 'present' or 'not present' within the pattern. For example, a retail store may be successful in neighborhoods that have an office building and a supermarket. These features of the Boolean pattern, 'office building' and 'supermarket', are either present or not present within the neighborhood. If these features are present, then it is an indication that a new retail store may perform well at a location within the neighborhood.

However mining Boolean data patterns does not solve a more important problem in selecting a location for a retail store. This problem is known as the critical mass problem. The critical mass problem addresses the minimum quantity of each feature a location would have in order for a new retail store to be successful at that location. Another type of search is called "exhaustive search." This type of search looks for patterns one by one and is considered slow in comparison with other types of search algorithms.

SUMMARY

Advantageously, a solution to the critical mass problem entails use of quantitative information excluded from Boolean data patterns by computing componentwise minimum patterns.

In one embodiment, a computer searching method, includes carrying out operations in at least one data processing device. The operations include
  receiving a quantitative pattern data set;
  applying a spatial indexing structure to the data set;
  responsive to a frequency threshold,
    identifying at least one componentwise minimum pattern corresponding to the frequency threshold; and
    outputting a search result indicating high quantitative patterns responsive to the componentwise minimum pattern.

In another embodiment, a computer program product carries out the operations of the above method.

In still another embodiment, a system includes a medium and at least one data processing device. The medium embodies program code and/or data for carrying out the above method on the data processing device.

In a further embodiment a computer searching method includes carrying out operations in at least one data processing device. The operations include:
  receiving a quantitative pattern data set;
  applying a spatial indexing structure to the data set;
  responsive to a spatial frequency threshold, isolating a representative spatial sub-set of the indexing structure; and
  outputting the spatial subset as a pattern that is a result of a search.

Objects and advantages will become apparent in the following.

BRIEF DESCRIPTION OF DRAWINGS

Embodiments will now be described by way of non-limiting example with reference to the following figures:

FIG. 10 shows more testing results of the disclosed embodiment.

DETAILED DESCRIPTION

Figure 1:
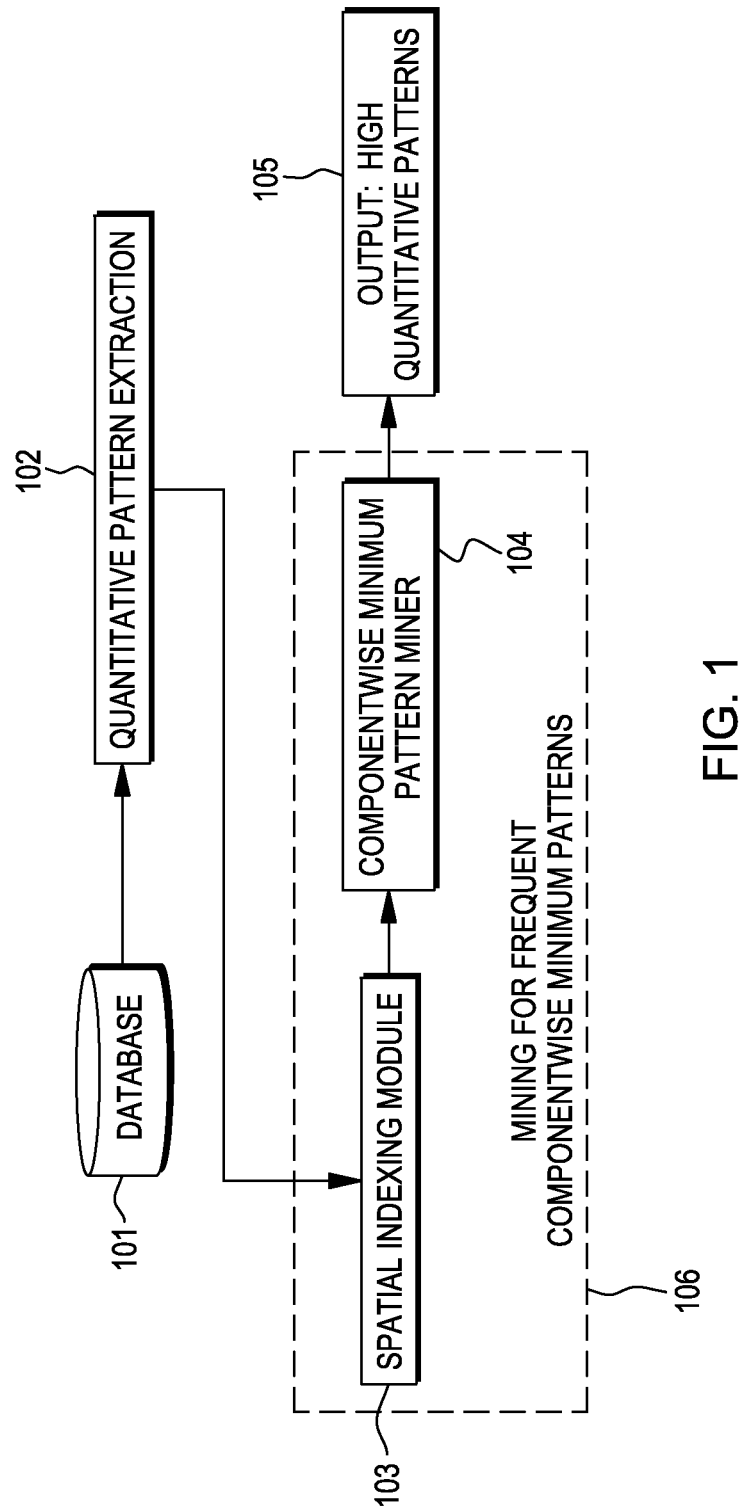
FIG. 1 shows an overview of an embodiment of the Frequent Componentwise Minimum Patterns Mining System with five parts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Herein a quantitative pattern will be represented by a vector of real numbers. In the retail store application, this vector represents the quantity of each feature for a successful store. For a given set of quantitative patterns, the vector defined by the minimum of each feature will be called the "componentwise minimum pattern" associated with that set of quantitative patterns. In one embodiment, the critical mass determined by a set of N stores, each with a quantitative pattern, is a set of componentwise minimum patterns with certain frequencies and the associated quantitative pattern, that satisfy the critical mass requirement as defined by the componentwise minimum patterns.

The embodiment presented herein is designed to solve a "critical mass" problem with respect to locating retail stores. By definition, a critical mass problem is one for which a feasible solution should have at least x number of each feature. In other words, it is critical if the number is too small for some features but not critical if the number is too large. In the retail store example, too many other businesses is of no concern, but too few of them could be a problem. One of ordinary skill in the art might easily extend these concepts to other critical mass problems. For instance, while the example is posed with respect to numbers of businesses of a particular type within a location, other features might be considered such as population, climactic conditions, transportation facilities, universities, suppliers, employees, customers. Moreover, the solution proposed is applicable to other types of critical mass problems, for instance aspects of crop placement in agriculture or adequacy of provision of support services, climate control devices, refreshments, and/or sanitary facilities, for instance in a work environment.

In practice, there is also a need to compute the critical mass determined by K out of N successful stores for any given K between 1 and N. N is the total number of stores in the training data set. K could be a predetermined number based on intuitive concept, or a running variable as input to the algorithm, a suitable value of which is to be determined on the basis of the output of the algorithm. This added flexibility enables the decision maker to choose a right frequency K that balances the risk and the requirement. Assuming that the risk decreases with the increase of the quantities for each feature, the critical mass determined by the entire set of N stores entails the lowest requirements for features, but the risk associated with it is also the highest. By choosing K less than N, the corresponding critical mass may increase for some features but the risk is reduced, by filtering out the less successful stores.

For each K subset of N quantitative patterns, there is an associated componentwise minimum pattern called a frequent componentwise minimum pattern with frequency K. A componentwise minimum pattern with frequency K is a componentwise minimum pattern associated with a K subset but is not the componentwise minimum pattern associated with any subset whose size is larger than K. Thus, as there may be some componentwise minimum patterns associated with a subset for some K' which is greater than K, by removing these patterns, the remaining ones are the componentwise minimum patterns with frequency K. In other words, a quantitative pattern is a feasible quantitative pattern associated with a componentwise minimum pattern with frequency K if each component of the quantitative pattern is greater than or equal to the corresponding component of the componentwise minimum pattern. Each componentwise minimum pattern with frequency K and the associated feasible quantitative patterns provide a solution to the critical mass problem. As K assumes values N, N−1, N−2, . . . , the corresponding componentwise minimum patterns define a hierarchy of critical mass solutions with increasing requirements and decreasing risks.

Computing the componentwise minimum pattern associated with a set of quantitative patterns can be done by taking the minimum of each feature over the quantitative patterns. A more difficult problem is to find all unique componentwise minimum patterns with frequency K, where K can be a value in 1, 2, ..., N. Thus, there is a need in the art for a method that efficiently discovers the componentwise minimum patterns, thus solving the critical mass problem.

Figure 7:
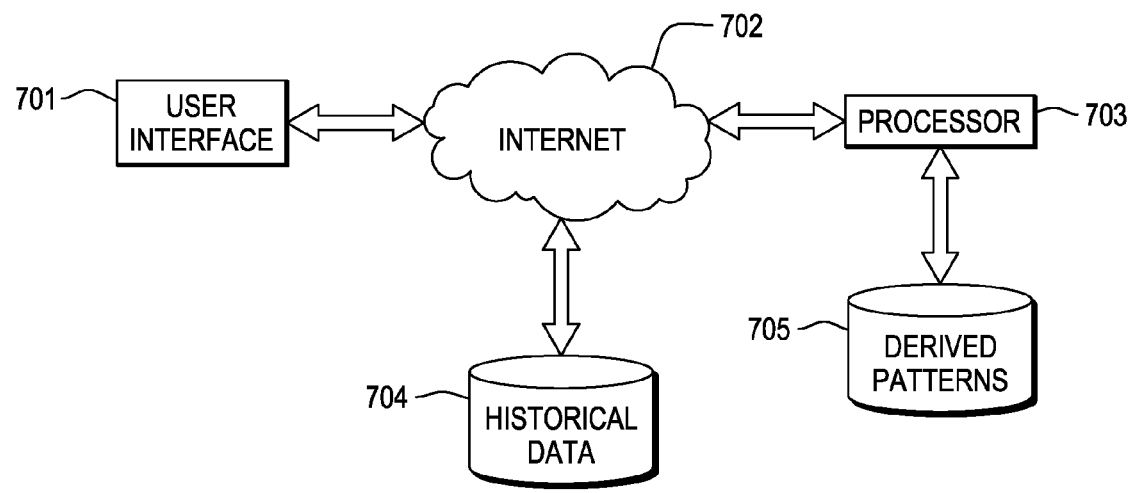
FIG. 7 is a schematic system diagram.

FIG. 7 shows a system in which the invention may be implemented. It includes a user interface 701 that communicates via a network 702 to a processor 703. The processor communicates via network 702 to historical data 704 to derive patterns 705. The system is not intended to be limited to any particular kind of processor, network, user interface, or type of data. Items shown may be in the same premises or distributed in various locations. Use of the Internet or a network for communication between illustrated elements is optional. The components may be directly connected to one another. Elements depicted as singular might be composed of several elements. Elements depicted as separate might be integrated.

FIG. 1 is a flow diagram showing an overview of an embodiment of a feasible quantitative pattern Mining System with five parts. A database 101 is processed using Quantitative Pattern Extraction 102. Results of quantitative pattern extraction are fed to a spatial indexing module 103. Results of the spatial indexing module are fed to a componentwise minimum pattern miner 104. Elements 103 and 104 are part of a data mining module 106. Componentwise minimum patterns with various frequencies and the associated feasible quantitative patterns are output at 105.

A quantitative pattern is defined by its components (or features or attributes). These components might include a set of items, sub-sequences, sub-structures, etc. Each component is also defined by a number of recurrences within a defined area. Each component in a quantitative pattern can be represented by a point in p-dimensional space. For a given set of quantitative patterns, the vector defined by the minimum of each feature is called the componentwise minimum pattern associated with that set of quantitative patterns.

Figure 2:
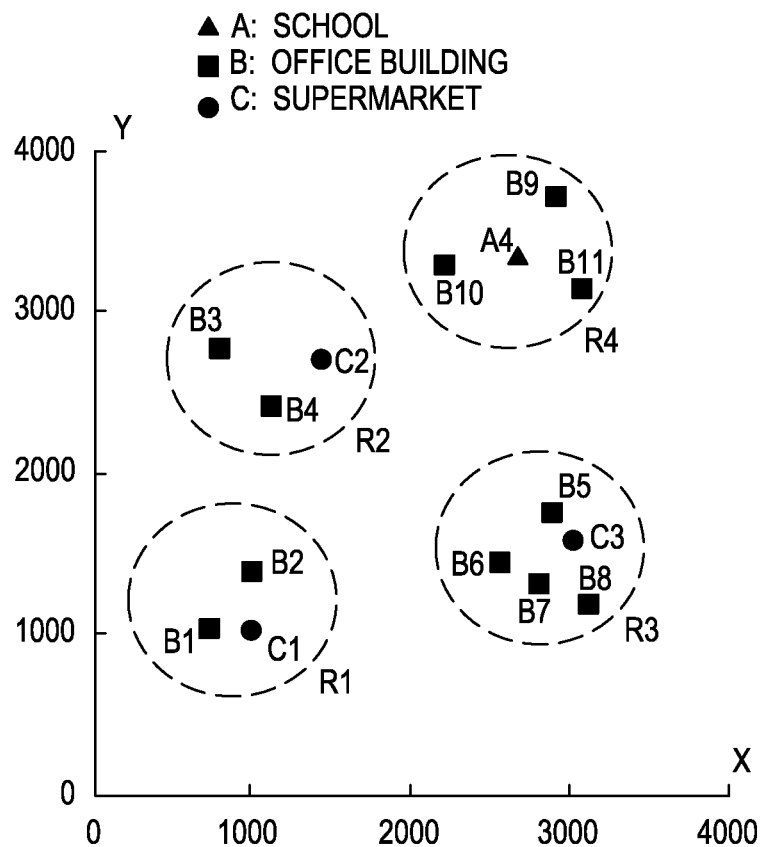
FIG. 2 shows the illustration of extracting quantitative geographic pattern dataset from GIS data.

FIG. 2 illustrates several examples of quantitative patterns $R_1$, $R_2$, $R_3$, $R_4$. As an example, '$R1$' describes a store whose area includes 2 office buildings ($B_1$, $B_2$) and 1 supermarket ($C_1$) and no school. '$R_2$' describes a store whose area also includes 2 office buildings ($B_3$, $B_4$) and 1 supermarket ($C_2$) and no school. '$R_3$' describes a store whose area includes 4 office buildings ($B_3$, $B_4$, $B_5$, $B_6$) and 1 supermarket ($C_3$) and no school. '$R_4$' describes a store whose area includes 3 office buildings ($B_9$, $B_{10}$, $B_{11}$) and 1 school ($A_4$) and no supermarket. The components and number of recurrences of each component within an area form the quantitative pattern.

There are 4 subsets with frequency 3: {R1, R2, R3}, {R1, R2,R4}, {R1,R3,R4}, and {R2,R3,R4}. The componentwise minimum pattern associated with subset {R1,R2,R3} is {2 office buildings, 1 supermarket, 0 schools}; the componentwise minimum pattern associated with subset {R1,R2,R4} is {2 office buildings, 0 supermarkets, 0 schools}; the componentwise minimum pattern associated with subset {R1,R3, R4} is {2 office buildings, 0 supermarkets, 0 schools}, and the componentwise minimum pattern associated with subset {R2,R3,R4} is {2 office buildings, 0 supermarkets, 0 schools}. Therefore, the distinct componentwise minimum patterns are {2 office buildings, 0 supermarkets, 0 schools} and {2 office buildings, 1 supermarket, 0 schools}. After removing the first pattern as it is also the componentwise minimum pattern of 4-element subset {R1,R2,R3,R4}, the remaining one is the componentwise minimum pattern with frequency 3 and the corresponding feasible quantitative patterns are R1, R2, and R3, which are the patterns that satisfy the critical mass requirement defined by the componentwise minimum pattern with frequency 3, i.e., {2 office buildings, 1 supermarket, 0 schools}.

The quantitative patterns $R_1$-$R_4$ can be mapped to points in a p-dimensional space, where there is one dimension per component. For example, '$R_1$' can be mapped to {2,1,0}, '$R_2$' can be mapped to {2,1,0}, '$R_3$' can be mapped to {4,1,0} and '$R_4$' can be mapped to {3, 0, 1} where the first point in the space represents office buildings, the second point represents supermarkets and the third point represents schools.

Figure 3:
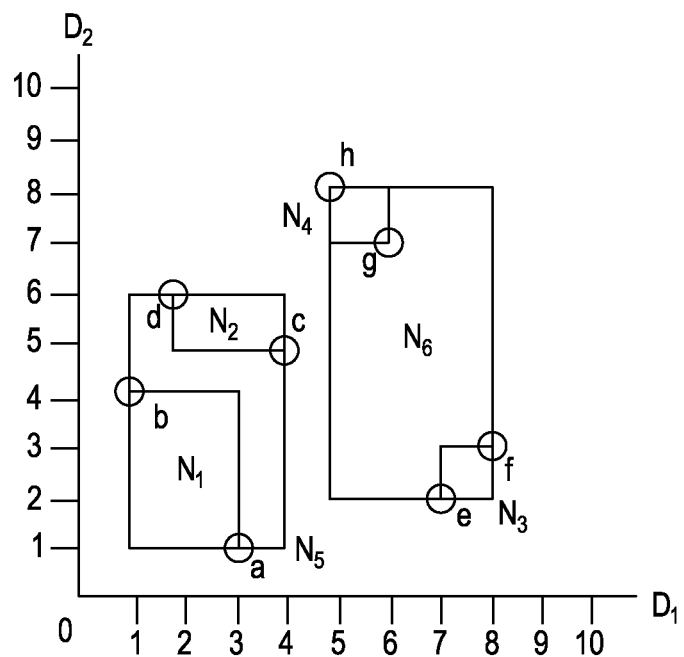
FIG. 3 shows hierarchical rectangles (Minimum Bound Rectangles or "MBR") for quantitative patterns.
Figure 4:
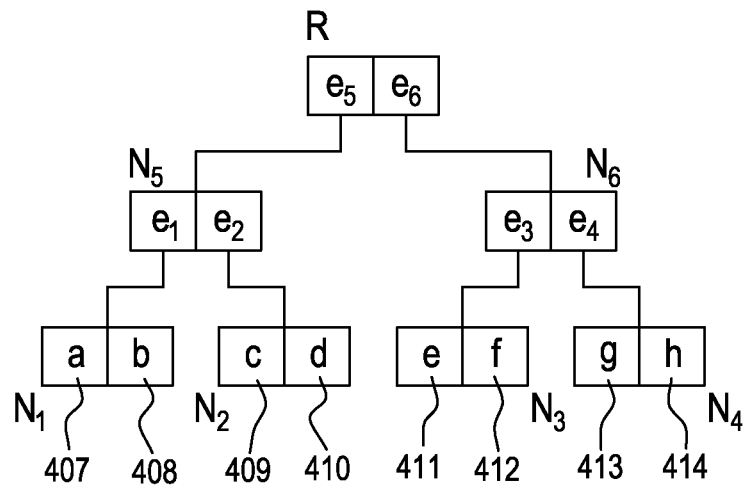
FIG. 4 shows an R-tree for quantitative patterns.

The following method may be used to discover quantitative patterns in a 2-dimensional example. Two dimensions are chosen for simplicity, but the method is equally applicable to higher dimension environments. FIGS. 3 and 4 are not representations of the facts presented in FIG. 2. FIGS. 3 and 4 relate to a further simplified example.

A spatial indexing structure, namely an R-tree, as shown in FIG. 4, is used to index the points (components) within the 2-dimensional environment. More about R-trees can be found in the Wikipedia article entitled "R-tree." The points are grouped together and bounded by hierarchical (Minimum Bound Rectangles or MBR) rectangles. In a higher dimension case, the MBR becomes the minimum bounding box. FIG. 3 shows MBRs $N_1$, $N_2$, $N_3$, $N_4$, $N_5$, $N_6$. As used herein, the term "MBR" is intended to include the minimum bounding box in the higher dimension cases (hyperspace); and recitations of an MBR algorithm are intended to include corresponding algorithms relating to hyperspace.

Each hierarchical rectangle is a node in the R-tree. R-trees are data structures that are used for spatial access methods, i.e., for indexing multi-dimensional information. The R-tree data structure splits space with the hierarchically nested, and overlapping, minimum bounding rectangles. Each node of the R-tree has a variable number of entries (up to some predefined maximum). Each entry within a non-leaf node stores two pieces of data: a way of identifying a child node, and the bounding rectangle of all entries within the child node. A point is grouped into a hierarchical rectangle (and also inserted into a node) when its placement in the rectangle results in the least enlargement of that rectangle in comparison to all of the other rectangles. Each entry within a leaf node stores two pieces of information, a way of identifying the actual point and the hierarchical rectangle that stores the point.

One of ordinary skill in the art might substitute other indexing methods, such as a kd-tree or M-tree.

For example, the points in FIG. 3 are bounded by hierarchical rectangles $N_1$, $N_2$, $N_3$, $N_4$, $N_5$, $N_6$. Each hierarchical rectangle corresponds to a correspondingly labeled portion of the R-tree shown in FIG. 4.

As shown in FIG. 3, points 'a' and 'b' are bounded by rectangle $N_1$. Points 'c' and 'd' are bounded by rectangle $N_2$. Points 'e' and 'f' are bounded by rectangle $N_3$. Points 'h' and 'g' are bounded by rectangle $N_4$. Rectangles $N_1$ and $N_2$ are bounded by rectangle $N_5$. Rectangles $N_3$ and $N_4$ are bounded by rectangle $N_6$.

In FIG. 4, nodes $e_1$ and $e_2$ correspond to rectangle $N_5$. Nodes $e_3$ and $e_4$ correspond to rectangle $N_6$. Node '$e_1$' has two leaves 'a' 407 and 'b' 408. Node '$e_1$' corresponds to rectangle $N_1$ shown in FIG. 3. Leaf 'a' 407 corresponds to point 'a' and leaf 'b' 408 corresponds to point 'b'. Node '$e_2$' has two leaves 'c' 409 and 'd' 410 that correspond to points 'c' and 'd' and rectangle $N_2$ in FIG. 3. Node $e_3$ has two leaves 'e' 411 and 'f' 412, which correspond to rectangle $N_3$. Node $e_4$ has two leaves 'g' 413 and 'h' 414 and corresponds to rectangle $N_4$.

Node $e_5$ has two leaves $e_1$ and $e_2$ and corresponds to rectangle $N_5$. Node $e_6$ has two leaves $e_3$ and $e_4$ and corresponds to rectangle $N_6$. Node R is the root node and corresponds to a larger rectangle in FIG. 3, which is not shown.

The R-tree may be constructed by known methods. In one embodiment, the R-tree is constructed by finding the closest pair of points and bounding those points by a rectangle, and then finding the second closest pair of points and bounding those points by a second rectangle, and continuing the method until all pairs are bounded by rectangles. Rectangles may also be bounded by higher level rectangles.

Figure 5:
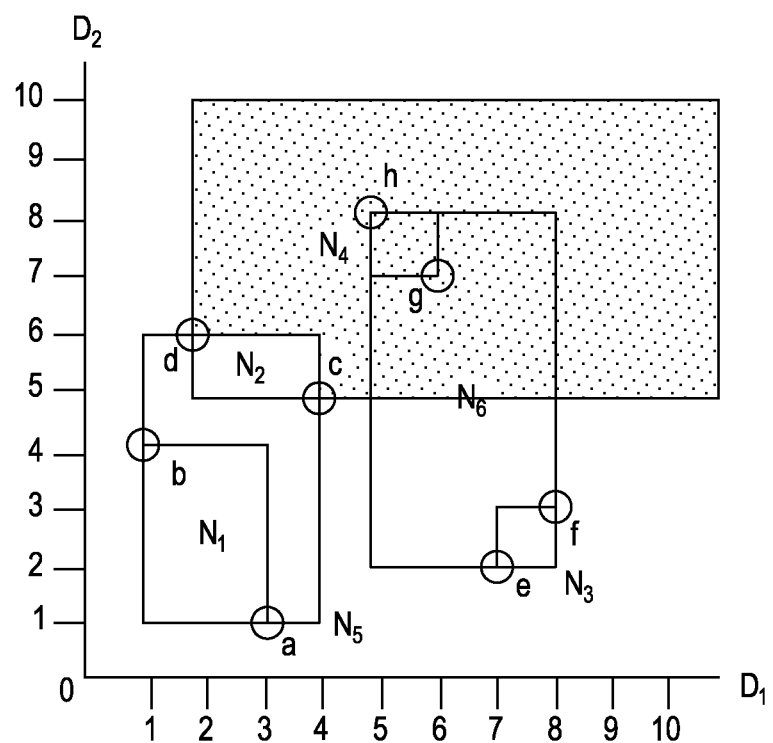
FIG. 5 shows the anchor points with K=3.

A search is performed to identify feasible quantitative patterns as follows. Given a number 'K', the search identifies the componentwise minimum patterns with frequency K. After that, feasible (e.g., high) quantitative patterns are all points on the top-right side of any of the componentwise minimum patterns. As shown in FIG. 5, there are two componentwise minimum patterns with frequency=3: point 'd' and 'c'. All points on the top-right side of point 'd' and 'c' (the shaded area) are feasible quantitative points: 'd', 'c', 'h' and 'g'.

In p-dimension hyperspace, considering point X ($x_1$, $x_2$, ..., $x_p$), and point Y ($y_1$, $y_2$, ..., $y_p$), where $x_i$ are the i-$^{th}$ axis value of point X. If $x_1 < y_1, x_2 < y_2, ..., x_p < y_p$, then point X is said to be on the bottom-left side of point Y. If $x_1 \geq y_1, ... x_p \geq y_p$, then X is said to be on the top-right side of Y. The frequency of a pattern considered as a point in the p-dimensional space will be defined as the number of patterns on the top-right side of that point.

Figure 6:
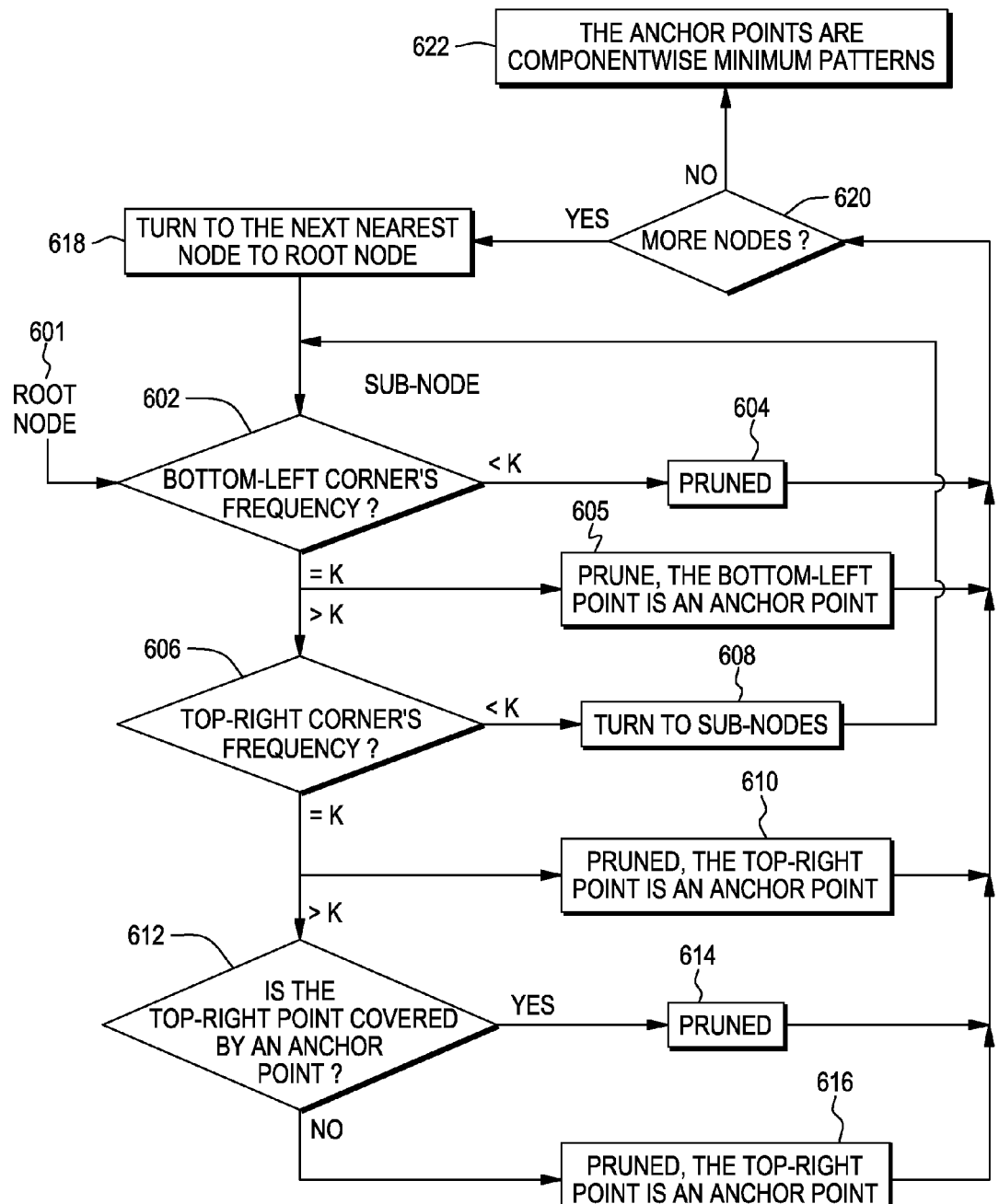
FIG. 6 shows the flow chart of R-tree based iterative process.

FIG. 6 illustrates one embodiment of an R-tree based iterative process for finding the componentwise minimum patterns with frequency K. The process may be used to prune R-tree nodes to speed up the search process for a quantitative pattern. The process starts at the 'root node' R per 601 and is based on a frequency threshold K, i.e., the quantitative pattern is frequent if it occurs 'K' or more times. At 602, the frequency of the bottom-left corner of the rectangle associated with the current node is tested against threshold K. At 604, if the frequency is less than 'K', then there is no frequent point in the rectangle, so the node and all the points inside the node are pruned from the search. If the frequency is equal to 'K' and no other point in the rectangle occurs more frequently, then at 605 the current point is an anchor point and the node is pruned from the search.

If the current frequency is greater than 'K', then the frequency of the top-right corner of the rectangle must be analyzed. The current frequency becomes the top-right corner frequency. At 606, if the current frequency is less than 'K', then the bottom-left point of the rectangle is frequent and the right-top point of the rectangle is infrequent. Therefore, some point in the node must occur with the frequency 'K' and the process proceeds to 608. At 608, the sub-nodes within the node are examined and control returns to 602. If 'the current frequency is equal to 'K', then the point is an anchor point and all of the points in this rectangle are frequent. Then per 610, this point is also an anchor point and the node is pruned from the search. If the current frequency is greater than 'K', then a determination is made per 612 if the top-right point of the rectangle is covered by any anchor point. If the top-right point of the rectangle is covered by any anchor point, then the node associated with the rectangle is pruned from the search per 614. Otherwise, the top right point is made into an anchor point and the rectangle is pruned at 616. After actions denominated 604, 605, 608, 610, 614, 616, a test is performed at 620 to see if more nodes need to be considered. If so, another iteration is taken at the next nearest node to the root node per 618. If not, the componentwise minimum patterns with frequency K are derived from the anchor points at 622, or, in this embodiment, they simply are the anchor points.

Referring back to FIGS. 3 and. 4, as an example, assume 'K'=3. The frequency of the bottom left corner of the root node is 8 and the frequency of the top-right corner is 0. The frequency of the top right corner is less than 'K', so the sub-nodes $N_5$ and $N_6$ are searched. For sub-node $N_6$, the frequency of the bottom-left corner of the rectangle is 4 and the frequency of the top-right corner is 0. The frequency of the top right corner is still less than 'K', so the sub-nodes $N_3$ and $N_4$ are searched. The frequency of the bottom-left corner of rectangles $N_3$ and $N_4$ are both less than 3, so these sub-nodes are pruned from the search. For sub-node $N_5$, the frequency of the bottom-left corner of the rectangle is 8 and the top-right corner is 2. The frequency of the top right corner is still less than 'K', so the sub-nodes of $N_5$, $N_1$ and $N_2$ are searched. For node $N_2$, the frequency of the bottom-left corner of the rectangle is 4 and the frequency of the top-right corner is 2. The frequency of the bottom left corner is greater than 'K', therefore points 'c' and 'd' are examined. Both points 'c' and 'd' occur with the frequency 'K' or 3. Therefore, 'c' and 'd' are both anchor points and are added to the anchor point set. For $N_1$, both corners' frequencies are greater than 3, and the top-right corner is covered by the anchor 'c', so $N_1$ is pruned. Therefore the final anchor point set has elements c and d.

Output High Quantitative Patterns

Once the componentwise minimum patterns with frequency K are found, the output will be the componentwise minimum patterns and all points on the top-right side of any of the componentwise minimum patterns (anchor points) e.g. in the shaded area of FIG. 5.

Figure 8:
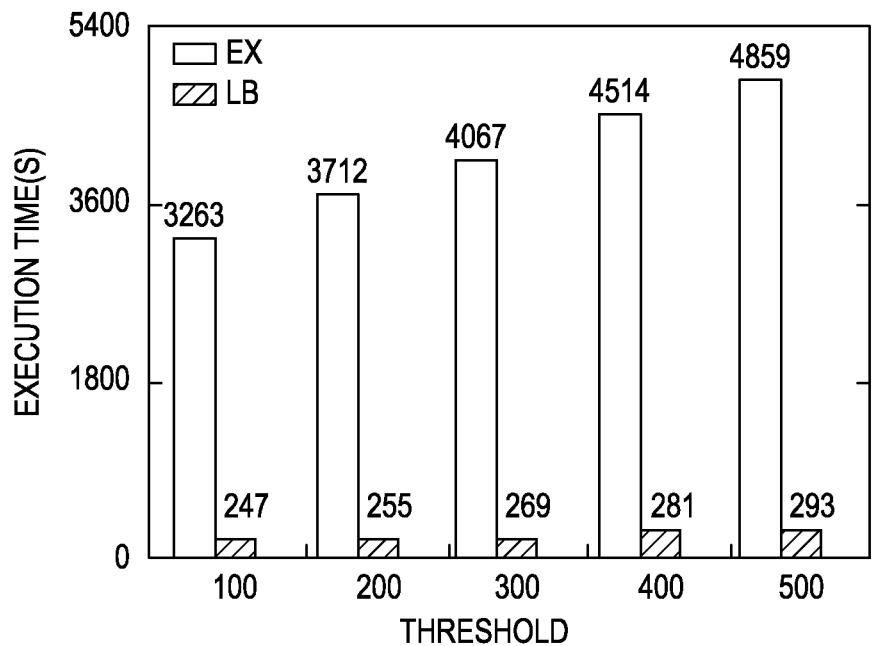
FIG. 8 shows results of testing the disclosed embodiment.
Figure 9:
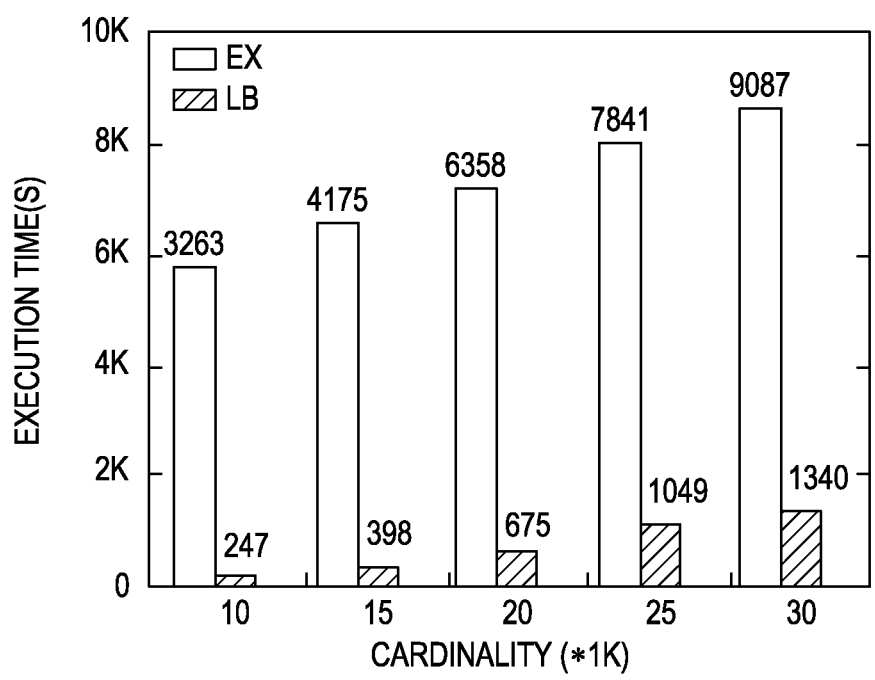
FIG. 9 shows additional results of testing the disclosed embodiment.

In FIGS. 8 and 9, "EX" stands for the exhaustive search algorithm, "LB" stands for the algorithm described n this invention. For each given pattern, a point in the hyperspace, the EX algorithm counts the patterns whose attributes are more than or equal to the corresponding attributes of that point; the count is called the frequency of that pattern.

In FIG. 8, the test pattern size is 10,000, generated by the method in S. Borzsonyi, D. Kossmann, and K. Stocker. "The skyline operator." In ICDE, pages 421-430, 2001. In FIG. 8, the "threshold" is K. In FIG. 9, "cardinality" is the pattern size of the dataset, and K=100.

Some test runs were made to test efficiency of the algorithm of the disclosed embodiment. FIG. 8 graphs execution time of the algorithm of the disclosed embodiment (LB) when compared with exhaustive search (EX). This graph has a vertical axis of execution time in seconds and a horizontal axis of values of K. The data was taken for 10,000 points and shows LB as using approximately 1/17 the amount of time used by EX.

FIG. 9 graphs execution time in seconds against numbers of points in thousands with a threshold value of K=100.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

From reading the present disclosure, other modifications will be apparent to persons skilled in the art. Such modifications may involve other features which are already known in the field of the invention and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Use of ordinal numbers, such as "first" or "second," is for distinguishing otherwise identical terminology, and is not intended to imply that operations or steps must occur in any particular order, unless otherwise indicated.

Where software or algorithms are disclosed, anthropomorphic or thought-like language may be used herein. There is, nevertheless, no intention to claim human thought or manual operations, unless otherwise indicated. All claimed operations are intended to be carried out automatically by hardware or software.

The invention claimed is:

1. A computer searching method, comprising carrying out operations in at least one data processing device, the operations comprising:
    applying a spatial indexing structure to a data set of quantitative patterns defined as vectors in a p-dimensional space;
    specifying a frequency K, wherein 1≤K≤N, where N is a number of quantitative patterns,
        identifying at least one componentwise minimum pattern corresponding to the frequency K; and
        outputting the at least one componentwise minimum pattern corresponding to the frequency and outputting quantitative patterns corresponding to said componentwise minimum pattern that satisfies a critical mass requirement defined by the componentwise minimum pattern at the frequency, said applying comprising creating an Minimum Bounding Rectangle (MBR) representation of the data set; and said identifying comprises:
        iterating through the MBR's;
        pruning the MBR's responsive to a spatial frequency measurement;
        deriving anchor points responsive to the spatial frequency measurement; and
        providing the at least one componentwise minimum pattern responsive to the anchor points,
    said outputting at least one componentwise minimum pattern comprising points on a top-right side of any component wise minimum pattern with frequency K,
    the spatial frequency measurement comprising:
        selecting a lower left and upper right corner of each MBR;
        counting a number of points in the data set above and to the right of each corner, the number being the spatial frequency measurement for that point; and
    said deriving anchor points comprising:
        selecting using said specified frequency an anchor point responsive to the spatial frequency measurement of one of the corners equaling the frequency; and
        pruning an MBR when one of its corners is selected as an anchor point;
        pruning a given MBR when the spatial frequency measurement of the bottom left corner of the given MBR is less than the threshold; and
        selecting a sub-rectangle within the MBR responsive to at least one pruning instance, wherein the at least one data processing device is programmed to perform said applying, said identifying and said outputting.

2. The method of claim 1, wherein the output identifies at least one portion of the data set that has a critical mass responsive to at least one search criterion.

3. The method of claim 2, wherein the search criterion seeks to locate suitable neighborhoods for establishing a business.

4. The method of claim 1, wherein each quantitative pattern in the pattern data set comprises data points relevant to prior fact instances and similar to at least one new fact instance corresponding to the search.

5. The method of claim 4, wherein the new fact instance is a type of business sought to be established and the quantitative pattern comprises instances of businesses neighboring prior instances of another business of that type.

6. The method of claim 1, wherein the spatial indexing structure is an R-tree.

7. The method of claim 1, comprising using a spatially based frequency measurement to identify componentwise minimum patterns.

8. The method of claim 1, wherein, for a p-dimensional hyperspace,
    considering point X $(x_1, x_2, \ldots, x_p)$, and point Y $(y_1, y_2, \ldots, y_p)$, where $x_i$ are the i-$^{th}$ axis value of point X and if $x_1 < y_1, x_2 < y_2, \ldots x_p < y_p$, point X is considered to be on the left-bottom side of point Y, and if $x_1 \geq y_1, \ldots x_p \geq y_p$, X is considered to be on the right-top side of Y.

9. A computer program product for carrying out operations, the computer program product comprising:
    a tangible storage media, said storage media not a propagating signal, said storage media readable by a processing circuit and storing instructions to be run by the processing circuit for performing a method comprising:
    applying a spatial indexing structure to a data set of quantitative patterns defined as vectors in a p-dimensional space;
    specifying a frequency K, wherein 1≤K≤N, where N is a number of quantitative patterns,
    identifying at least one componentwise minimum pattern corresponding to the frequency K; and
    outputting the at least one componentwise minimum pattern corresponding to the frequency and outputting quantitative patterns corresponding to said componentwise minimum pattern that satisfies a critical mass requirement defined by the componentwise minimum pattern at the frequency, said applying comprising creating an Minimum Bounding Rectangle (MBR) representation of the data set; and said identifying comprises:
   iterating through the MBR's;
   pruning the MBR's responsive to a spatial frequency measurement;
   deriving anchor points responsive to the spatial frequency measurement; and
   providing the at least one componentwise minimum pattern responsive to the anchor points, said outputting at least one componentwise minimum pattern comprising points on a top-right side of any component wise minimum pattern with frequency K,
the spatial frequency measurement comprising:
   selecting a lower left and upper right corner of each MBR;
   counting a number of points in the data set above and to the right of each corner, the number being the spatial frequency measurement for that point; and
said deriving anchor points comprising:
   selecting using said specified frequency an anchor point responsive to the spatial frequency measurement of one of the corners equaling the frequency; and
   pruning an MBR when one of its corners is selected as an anchor point;
   pruning a given MBR when the spatial frequency measurement of the bottom left corner of the given MBR is less than the threshold; and
   selecting a sub-rectangle within the MBR responsive to at least one pruning instance.

10. The computer program product of claim 9, wherein the pattern output identifies at least one portion of the data set that has a critical mass responsive to at least one search criterion.

11. The computer program product of claim 10, wherein the search criterion seeks to locate suitable neighborhoods for establishing a business.

12. The computer program product of claim 9, wherein each quantitative pattern in the pattern data set comprises data points relevant to prior fact instances and similar to at least one new fact instance corresponding to the search.

13. The computer program product of claim 9, wherein, for a p-dimensional hyperspace,
   considering point X $(x_1, x_2, \ldots, x_p)$, and point Y $(y_1, y_2, \ldots, y_p)$, where $x_i$ are the $i\text{-}^{th}$ axis value of point X and if $x_1 < y_1, x_2 < y_2, \ldots x_p < y_p$, point X is considered to be on the left bottom side of point Y, and if $x_1 \geq y_1, \ldots x_p \geq y_p$, X is considered to be on the right-top side of Y.

14. A system comprising:
at least one data processing device;
at least one tangible storage device readable by said data processing device, the device embodying data and/or computer program code for causing the data processing device to carry out operations, the operations comprising:
   applying a spatial indexing structure to a data set of quantitative patterns defined as vectors in a p-dimensional space;
   specifying a frequency K, wherein $1 \leq K \leq N$, where N is a number of quantitative patterns,
   identifying at least one componentwise minimum pattern corresponding to the frequency K; and
   outputting the at least one componentwise minimum pattern corresponding to the frequency and outputting quantitative patterns corresponding to said componentwise minimum pattern that satisfies a critical mass requirement defined by the componentwise minimum pattern at the frequency, said applying comprising creating an Minimum Bounding Rectangle (MBR) representation of the data set; and said identifying comprises:
      iterating through the MBR's;
      pruning the MBR's responsive to a spatial frequency measurement;
      deriving anchor points responsive to the spatial frequency measurement; and
      providing the at least one componentwise minimum pattern responsive to the anchor points, said outputting at least one componentwise minimum pattern comprising points on a top-right side of any component wise minimum pattern with frequency K,
   the spatial frequency measurement comprising:
      selecting a lower left and upper right corner of each MBR;
      counting a number of points in the data set above and to the right of each corner, the number being the spatial frequency measurement for that point; and
   said deriving anchor points comprising:
      selecting using said specified frequency an anchor point responsive to the spatial frequency measurement of one of the corners equaling the frequency; and
      pruning an MBR when one of its corners is selected as an anchor point;
      pruning a given MBR when the spatial frequency measurement of the bottom left corner of the given MBR is less than the threshold; and
      selecting a sub-rectangle within the MBR responsive to at least one pruning instance, said at least one data processing device adapted to carry out the operations responsive to the medium.

15. The system of claim 14, wherein the pattern output identifies at least one portion of the data set that has a critical mass responsive to at least one search criterion.

16. The system of claim 15, wherein the search criterion seeks to locate suitable neighborhoods for establishing a business.

17. The system of claim 14, wherein each quantitative pattern in the pattern data set comprises data points relevant to prior fact instances and similar to at least one new fact instance corresponding to the search.

* * * * *